(12) United States Patent
Paulssen et al.

(10) Patent No.: US 9,676,433 B2
(45) Date of Patent: Jun. 13, 2017

(54) TWO-WHEELER STAND WITH FILLABLE BASE ELEMENT AND METHOD

(71) Applicant: MPB Concepts B.V., Eindhoven (NL)

(72) Inventors: Maurice Wilhelmus León Paulssen, Montfort (NL); Koen Paul Marie Maas, Kinrooi (BE)

(73) Assignee: MPB Concepts B.V., Eindhoven (NL)

( * ) Notice: Subject to any disclaimer, the term of this patent is extended or adjusted under 35 U.S.C. 154(b) by 0 days.

(21) Appl. No.: 14/946,127

(22) Filed: Nov. 19, 2015

(65) Prior Publication Data

US 2016/0137244 A1     May 19, 2016

(30) Foreign Application Priority Data

Nov. 19, 2014    (NL) ..................................... 2013830

(51) Int. Cl.
*A47F 7/00*     (2006.01)
*B62H 3/08*     (2006.01)
(Continued)

(52) U.S. Cl.
CPC ............. *B62H 3/08* (2013.01); *B62H 3/00* (2013.01); *B62H 3/04* (2013.01)

(58) Field of Classification Search
CPC ... B62H 3/08; B62H 3/00; B62H 3/04; B62H 2003/005; B62H 3/10; B62H 3/06;
(Continued)

(56) References Cited

U.S. PATENT DOCUMENTS

| | | | | |
|---|---|---|---|---|
| 369,494 | A | * | 9/1887 | Bailey .................... B62H 3/08 211/20 |
| 446,835 | A | * | 2/1891 | Kennedy ................. B62H 3/08 211/20 |

(Continued)

FOREIGN PATENT DOCUMENTS

| | | |
|---|---|---|
| GB | 2009068 A | 6/1979 |
| JP | 11-334662 | 7/1999 |
| KR | 10-2011-0041913 A | 4/2011 |

OTHER PUBLICATIONS

IE Patent Application No. S981069 with drawings; 8 pages; dated Nov. 8, 1999.

*Primary Examiner* — Jennifer E Novosad
(74) *Attorney, Agent, or Firm* — Shumaker, Loop & Kendrick, LLP

(57) ABSTRACT

The invention relates to a two-wheeler stand and also to a method for assembling the same, which two-wheeler stand is configured to support a two-wheeler parked in or on the two-wheeler stand and which comprises a base element provided with a positioning element at the upper side thereof, which positioning element defines a wheel supporting surface, a carrying element which extends upward from the base element, a support element carried by the carrying element above the wheel supporting surface, which support element supports a two-wheeler parked in the two-wheeler stand in use. The invention is characterized in that the base element is made up at least of an upper wall, a lower wall, and a circumferential wall which connects the upper wall and the lower wall, wherein the upper wall, the lower wall and the circumferential wall enclose a chamber, and wherein a filling hole is provided in the base element, so that the chamber can be filled with a medium through the filling hole.

7 Claims, 7 Drawing Sheets

(51) Int. Cl.
*B62H 3/04* (2006.01)
*B62H 3/00* (2006.01)

(58) Field of Classification Search
CPC ... B62H 1/00; B62H 1/02; B62H 1/04; B62H 1/06; B62H 2700/00; B60R 9/10; B60R 9/06; B60R 9/065; A63B 22/06; A63B 69/16; A63B 2069/16; A63B 2069/161; A63B 2069/162; A63B 2069/164; A63B 2069/165; A63B 2069/166; A63B 2069/163; A47F 10/04; A47F 7/04
USPC ............ 211/17, 20, 22, 175, 19, 18, 24, 23; 248/910; D12/406, 407, 115
See application file for complete search history.

(56) References Cited

U.S. PATENT DOCUMENTS

| | | | | |
|---|---|---|---|---|
| 468,920 A * | 2/1892 | Ross | B62H 3/00 | 211/22 |
| 488,395 A * | 12/1892 | Justice | B62H 3/08 | 188/32 |
| 491,475 A * | 2/1893 | Elliott | B62H 3/00 | 211/22 |
| 529,939 A * | 11/1894 | Noderer | B62H 3/08 | 211/20 |
| 562,669 A * | 6/1896 | Smart | B62H 3/08 | 211/20 |
| 568,855 A * | 10/1896 | Kennedy | B62H 3/00 | 211/22 |
| 594,748 A * | 11/1897 | Le Fevre | B62H 3/00 | 211/173 |
| 596,541 A * | 1/1898 | Price | B62H 3/00 | 211/22 |
| 602,665 A * | 4/1898 | McBurney et al. | B62H 3/00 | 211/22 |
| 619,186 A * | 2/1899 | Kingsbury | B62H 3/00 | 211/22 |
| 623,785 A * | 4/1899 | Hubbell | B62H 3/00 | 211/170 |
| 1,450,680 A * | 4/1923 | Guazzoni | B62H 3/00 | 15/160 |
| 3,116,836 A * | 1/1964 | McCauley | B62H 3/08 | 211/21 |
| 3,901,421 A * | 8/1975 | Kalicki | B60R 9/10 | 211/17 |
| 3,907,114 A * | 9/1975 | Ewers | B62H 3/04 | 211/20 |
| 4,026,546 A * | 5/1977 | Omori | A63B 69/16 | 211/22 |
| 4,442,961 A * | 4/1984 | Bott | B60R 9/10 | 211/20 |
| 5,036,986 A * | 8/1991 | Kral | B62H 3/08 | 211/20 |
| 5,078,277 A * | 1/1992 | Tschritter | F16M 13/00 | 211/20 |
| 5,267,657 A * | 12/1993 | McGuiness | B62H 3/08 | 211/17 |
| 6,062,396 A * | 5/2000 | Eason | A47F 7/04 | 211/20 |
| 7,273,197 B1 | 9/2007 | Huggins et al. | | |
| D562,217 S * | 2/2008 | Davis | D12/408 | |
| 8,500,074 B1 | 8/2013 | Cochran et al. | | |
| 8,893,900 B2 * | 11/2014 | Kedar | B62H 3/08 | 211/20 |
| 2015/0360739 A1* | 12/2015 | Ashlag | B62H 3/04 | 29/426.2 |
| 2016/0137244 A1* | 5/2016 | Paulssen | B62H 3/00 | 211/20 |

* cited by examiner

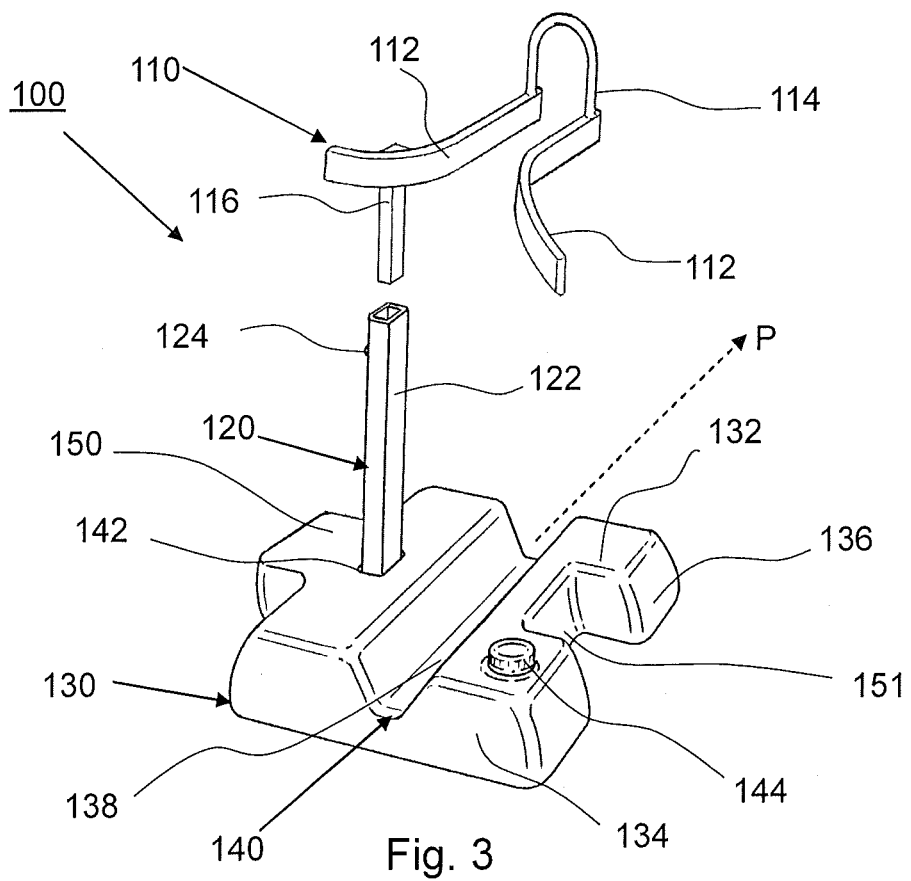
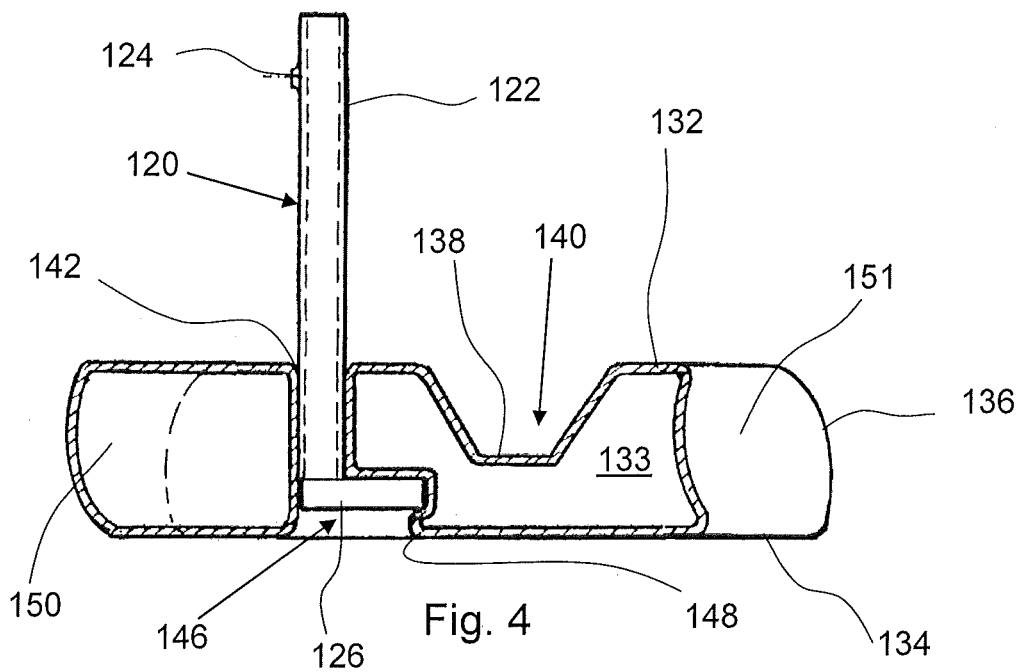

TWO-WHEELER STAND WITH FILLABLE BASE ELEMENT AND METHOD

The invention relates to a two-wheeler stand for a two-wheeler.

A generally known two-wheeler stand is known from NL 6601362 A. The known two-wheeler stand comprises a block made of reinforced concrete, an upper side of which provides a wheel supporting surface for load-carrying support of the front wheel of a two-wheeler parked on the two-wheeler stand. A threshold is provided at the front side of the block. The known two-wheeler stand also comprises support elements extending from the block, which each terminate in a tube end, between which tube ends the front fork of a two-wheeler is inserted and clamped in use. Upon being placed in the stand, a two-wheeler is driven against the threshold. Immediately after reaching the highest point of the threshold, said two-wheeler will experience a force under the influence of gravity, which force causes the two-wheeler to move forward, so that the front wheel is placed on the block. At the same time, the front fork of said two-wheeler is clamped between the tube ends. The reinforced concrete block provides sufficient mass for keeping the support elements and thus the two-wheeler in a stable position, in this way preventing the two-wheeler from tipping over.

Other two-wheeler stands are known from KR 2011 0041913 A, U.S. Pat. No. 8,500,074 B1, U.S. Pat. No. 5,267,657 A, U.S. Pat. No. 7,273,197 B1 and JP H11 334662 A.

A drawback of the known two-wheeler stand is that its usability is limited. The preparations needed for a first use of the known two-wheeler stand are laborious and relatively time-consuming. Particularly disadvantageous is the fact that the known two-wheeler stands are not suitable, or only to a limited extent, for use by private individuals.

Accordingly it is an object of the present invention to provide a two-wheeler stand, in particular for use by private individuals, wherein the two-wheeler stand is preferably of simple construction and/or quickly ready for use.

In order to achieve this object, the present invention provides a two-wheeler stand as defined in claim 1.

The two-wheeler stand according to the present invention comprises a base element provided with a positioning element in the form of a recess in the upper side of the base element, which positioning element defines a wheel supporting surface for load-carrying support, in use, of a wheel, in particular the front wheel of a two-wheeler parked in the two-wheeler stand. A wheel of a two-wheeler parked in the two-wheeler stand is thus supported by the wheel supporting surface of the positioning element in use.

A carrying element extends upward from the base element. The carrying element carries a support element above the wheel supporting surface, which support element in use supports a two-wheeler parked in the two-wheeler stand.

The base element is made up at least of an upper wall, a lower wall, and a circumferential wall which connects the upper wall and the lower wall. The upper wall, the lower wall and the circumferential wall enclose a chamber and may gradually blend into each other. The base element is thus hollow, as it were, and as such it can be filled with a relatively heavy medium, such as water, cement or sand. Said medium can enter the chamber through a filling hole in the base element.

As a result of the relatively low weight of the two-wheeler stand in the unfilled condition of the chamber in the base element and the detachability of the carrying element, a user can readily transport the two-wheeler stand to a desired location. Once arrived at the desired location for using the two-wheeler stand, the user will fill the chamber with a relatively heavy medium through the filling hole, so that the base element is provided with an additional mass, which is required with a view to the stability of the two-wheeler stand. The present invention is in part based on the perception that the two-wheeler stand can be formed and transported separately from the mass of the base element that is required for the stability thereof. By using the fillable base, in combination with the positioning element provided in the form of a recess therein, and the carrying element that is connectable to the base, a stable placement of the bicycle becomes possible, wherein the fact that the base is fillable and the carrying elements are detachable makes it possible to provide a lightweight and compact set, which set is easy to transport at relatively low cost. Because of this, the two-wheeler stand is also quite suitable for use by private individuals. The object of the present invention is thus achieved.

The medium with which the base element can be filled is in particular a flowable material, such as water, sand, gravel or cement. Depending on the shape of the base element and the type of medium, several filling holes and/or chambers may be provided in the base element. The medium may be removably accommodated in the base element, for example in the case of water, which can be removed via the filling hole, or be permanently contained in the chamber of the base element, for example in the case of cement. The filling hole can be closed by means of a cap element so as to prevent fouling of the chamber, but the presence of such a cap element is not necessary.

In assembled condition, the two-wheeler stand according to the present invention is accessible to a two-wheeler from the front side for parking the two-wheeler in the two-wheeler stand. A user can place the front wheel or the rear wheel in and/or on the positioning element, whereupon the two-wheeler is supported by the support element, so that a stable position of the two-wheeler is obtained.

In one embodiment, the positioning element is configured as a sloping (in use) upper surface of the base element. Seen in cross-sectional view, the lower wall for example extends substantially sideward (horizontally) in use, and the circumferential wall extends substantially upward (vertically). Seen in said cross-sectional view, the upper wall in that case slopes at least partially down between the uppermost end of the circumferential wall at the front side and a lower end of the lower wall or the circumferential wall at the rear side. The upper wall is in that case curved in the form of an upward arc, for example, one leg of the arc being longer than the other leg. In a simple exemplary embodiment, the base element is configured as a substantially right-angled triangle, seen in cross-sectional view. In use, the hypotenuse of the triangle forms the upper side of the base element. The positioning element is formed by said downwardly sloping upper side, which is configured to drive a wheel placed thereon, and thus a two-wheeler, against the support element under the influence of the force of gravity.

In one embodiment, the connecting means are configured for repeated detachable connection of the carrying element to the base element. By detaching the carrying element from the base element, the overall dimensions of the two-wheeler stand can be reduced in a simple manner in comparison with the assembled condition, so that the two-wheeler stand will be easier to transport and subsequently reassemble.

In one embodiment, the two-wheeler stand comprises two carrying elements located on either side of the positioning element, which carrying elements preferably extend parallel to each other in use and which are both provided with a support element. In this way the two-wheeler stand is given additional stability.

In one embodiment, the two-wheeler stand comprises two support element parts for supporting, in use, a two-wheeler parked on the stand, such as a front fork and/or a front wheel thereof. The support element may comprise the two support element parts, or two support elements each comprising one support element part may be provided. Each one of the support element parts may in that case extend parallel to or at an angle to the longitudinal direction of the base element (which longitudinal direction extends between a front side and a rear side of the two-wheeler stand), wherein the support element parts are disposed at an angle relative to each other, such that, seen from above, a receiving opening for the front fork and/or the front wheel of the two-wheeler, which substantially converges between the front side and the rear side, is formed between the support element parts. The support element parts may be located between the front side and the rear side of the two-wheeler stand. Because of the converging configuration of the receiving opening, front forks of varying dimensions can be received in the receiving opening. In addition to that, in one embodiment such a converging receiving opening is suitable for clamping a wheel or a front fork.

In one embodiment, the support element parts may be interconnected, so that the two support element parts can be attached to one carrying element. Alternatively, two carrying elements extending parallel to each other may be provided on either side of the positioning element, to each one of which a support element part is connected.

In one embodiment, the wheel supporting surface for load-carrying support of the front wheel essentially slopes down, in particular continuously, between the front side and the rear side of the two-wheeler stand. Because of the continuous, downwardly sloping nature of the wheel supporting surface and the resulting influence of the force of gravity on the front wheel, the front wheel of the two-wheeler will at all times experience a force in the direction of the rear side of the two-wheeler stand when the two-wheeler is placed in the two-wheeler stand. The location of the exact point of contact between the front wheel and the wheel supporting surface is irrelevant in that regard. The sloping wheel supporting surface and the resulting force on the front wheel will at all times automatically urge the front fork of the two-wheeler into contact with the support element. Such a configuration of the two-wheeler stand is known from Dutch patent NL 205812, which is incorporated herein by reference. Alternatively it is conceivable to have the support element parts extend substantially parallel to each other, so that they enclose the front wheel at least partially.

In one embodiment, the carrying element is detachably connected to the support element. The support element and/or the carrying element may in that case be provided with further connecting means for repeated detachable connection of the support element to the carrying element. This makes it possible to realise a more compact placement of the parts during transport. The further connecting means are for example a ring or a receiving cavity, which is configured to receive one end of the carrying element. Alternatively, the carrying element is fixedly connected to the support element. It is also conceivable for the support element to be pivotally and rotatably connected to the carrying element, so that the dimensions of the carrying element-support element combination can be reduced in a simple manner for transport by "collapsing" the support element.

In one embodiment, the carrying element is substantially made up of an elongate bar element, which is directed upwards in use, and a foot part connected at an angle thereto. Said angle may be a substantially right angle. If the carrying elements are used, each carrying element may be provided with a bar element which is connected to a foot part. Said two foot parts may be interconnected so as to form a U-shape. The two bar elements are in that case disposed at an angle, possibly a right angle, relative to the plane of the U-shape of the interconnected foot parts. In an assembled condition, the foot part extends substantially sideward, forward and/or rearward along the bottom side of the base element, while the bar element with the support element extends substantially vertically. In this way a stable position of the carrying element is realised. The foot part may be configured as a bar element or a plate element.

In one embodiment, the base element comprises a passage through which the carrying element with the foot extends from the bottom side (in use) to the upper side of the base element. In this way the bar element of the carrying element can extend upward through the passage in use, whilst the foot part bears against the bottom side of the base element so as to realise a stable position of the carrying element. In use, the foot part extends forward or rearward from the passage. The carrying element can in that case be moved into the passage at the bottom side of the base element with the bar element thereof, until the foot part makes contact with the bottom side of the base element. A user will thus slide the two-wheeler stand together in a simple manner. In this way a two-wheeler stand that is easy to assemble but nevertheless stable is formed.

At the bottom side of the base element, a recess may be provided for the foot part, so that the flat bottom side of the base element can remain in contact with the ground surface without the foot part forming an impediment. This increases the stability and solidity of the two-wheeler stand. In one embodiment, a fixing element is provided in the recess, for example on the vertical wall portion thereof, near the bottom side of the recess, which fixing element is capable of fixing the foot part in the recess. Such a fixing element is a projection, for example. A user slides the carrying element through the passage in the base element until the foot part passes the fixing element and "snaps in place". The fixing element is configured to absorb the moment that is transmitted to the foot part upon placement of a two-wheeler against the support element on the bar element. The fixing element fixes the carrying element so as to realise a stable placement of a two-wheeler. It is conceivable to use more than one fixing element, for example on either side of the recess.

According to the invention, the positioning element is configured as a recess in the base element. Said recess may extend over the entire width of the base element or be provided in the form of a groove in a part of the surface. The recess may also be made up of two upright edges on the base element. The groove may be round, rectangular, trapezoidal or multi-angular in cross-section. The wheel supporting surface may as such be made up of a single surface or by several surfaces located opposite each other, for example in the case of a V-shaped cross-section of the recess. The positioning element may be provided in the form of a gutter element on the upper side of the base element or in the form of a transversely extending slope of, for example, a threshold on the upper side of the base element.

In one embodiment, the upper wall, the lower wall and/or the circumferential wall of the base element are made of a relatively thin-walled material, so that the base element will remain relatively light in weight, whilst the volume of the chamber that is to be filled can be maximised. The base element may be made of a plastic material. The carrying element may be made of a metal, in particular aluminum, but it is also possible to use a strong plastic material. The support element may be made of a plastic material, but it is also possible to use a metal. It is also conceivable to use composite materials or other lightweight materials that are known to the skilled person, such as carbon.

In one embodiment, the base element is provided with a laterally extending (in use) projection on a first side, and with a correspondingly shaped recess on a second side opposite the first side. The recess and the projection thus form the complementary parts of a male-female connection, so that several base elements and thus two-wheeler stands can be connected or fitted together in a simple manner.

The invention further relates to a base element according to the present invention for use in a two-wheeler stand according to the present invention. Such a base element can have a diameter between 10 cm and 100 cm. In use, the height of the base element will range between 5 cm and 100 cm, for example, quite preferably between 10 cm and 50 cm.

The invention further relates to a set of components from which a two-wheeler stand according to the present invention can be formed. Such a set of components comprises at least a base element, two carrying elements and two support elements as described in the foregoing, and has the advantages already mentioned in the foregoing.

The invention further relates to a method for assembling a two-wheeler stand according to the present invention. The method comprises the steps of placing the base element at a desired location, connecting the carrying element to the base element, as well as the step of filling the chamber with a medium through the filling hole. In this way a compact, easily transportable and widely usable two-wheeler stand is obtained in a simple manner.

In one embodiment, the method comprises the step of connecting the support element to the carrying element.

The invention will now be explained in more detail with reference to a few embodiments of the present invention. Reference is made to the following figures, in which:

FIG. 3 is a perspective view of a partially disassembled second embodiment of the two-wheeler stand;

FIG. 4 is a cross-sectional view of a base element and a carrying element according to the second embodiment of the two-wheeler stand;

Figure 1:
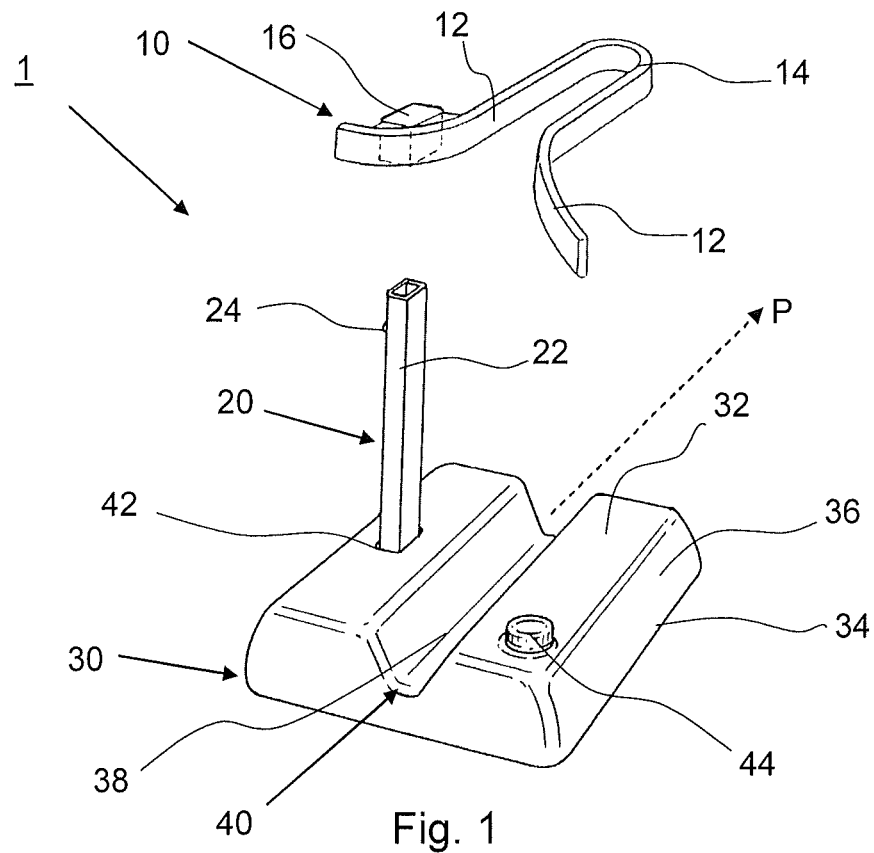
FIG. 1 is a perspective view of a partially, disassembled first embodiment of the two-wheeler stand.

FIG. 1 shows in perspective view a partially disassembled first embodiment of the two-wheeler stand 1 according to the present invention. The two-wheeler stand 1 comprises a base element 30, which is configured to be placed on a ground surface. In FIG. 1, a carrying element 20 is placed in connecting means 42 in the base element 30. A support element 10 can be connected to the carrying element 20 by means of further connecting means 16, 24.

The base element 30 comprises a wheel supporting surface 38 for load-carrying support of a front wheel (not shown) of a two-wheeler in the parked position of said two-wheeler. The base element 30 is made up of at least one upper wall 32, a lower wall 34, and a circumferential wall 36, which connects the upper wall 32 and the lower wall 34. The upper wall 32, the lower wall 34 and the circumferential wall 36 enclose a chamber (indicated at 33 in FIG. 2). A filling hole (31 in FIG. 2) is provided in the base element 30, so that the chamber 33 can be filled with a medium through the filling hole 31. In FIG. 1 the filling hole 31 is closed by means of a closable cap element 44. The positioning element 40 is configured as a recess 40 or gutter element 40 in the base element 30. The dimensions of said recess 40 are such that a wheel of a two-wheeler can be positioned therein. The recess 40 shown in FIG. 1 is trapezoidal in section, but it may also be rounded, triangular or multi-angular. In the base element a cavity 42 or a passage 42 is provided, which is configured to receive the carrying element 20. Using such connecting means 42, the carrying element is detachably connectable to the base element 30 on repeated occasions.

The carrying element shown in FIG. 1 is configured as a bar element 22, which extends upward from the connecting means 42 in use. Near the upper end of the bar element 22, further connecting means 24 are provided, which are configured for repeated detachable connection of the support element 10 to the carrying element 20. In FIG. 1, the further connecting means 24 on the carrying element 20 are configured to mate with further connecting means 16 on the support element 10, for example for forming a snap connection.

The support element 10 shown in FIG. 1 comprises a bracket 14, which is configured to receive a wheel or front fork of a two-wheeler. This bracket 14 also connects the support element portions 12, so that only one carrying element 20 is needed for supporting the support element portions 12.

In FIG. 1, arrow P indicates the longitudinal direction of the base element 30, which extends from the front side of the base element 30 to the rear side thereof. A two-wheeler is parked in the two-wheeler stand 1 in this longitudinal direction P by moving the front wheel into the recess 40 and thus onto the wheel supporting surface 38, after which the front wheel or the front fork is moved into the support element 40 for realising a stable position of the two-wheeler.

Figure 2:
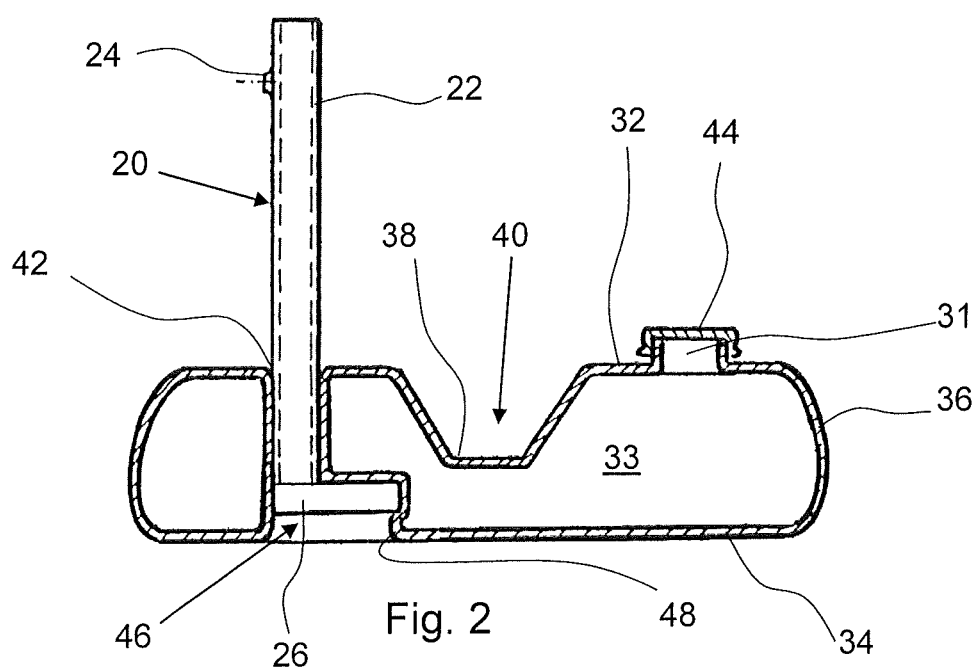
FIG. 2 is a cross-sectional view of a base element and a carrying element according to the first embodiment of the two-wheeler stand.

FIG. 2 shows a cross-sectional view of a base element 30 and a carrying element 20 according to the first embodiment of the two-wheeler stand 1. The base element 30 and the carrying element 20 comprise the parts discussed with reference to FIG. 1. In FIG. 2, the carrying element 20 is configured as an L-shaped element, wherein the carrying element 20 is substantially made up of an elevated bar element 22, which is directed upward in use, and a foot part 26, which is connected at an angle thereto. The foot part 26 can be bar-shaped or plate-shaped. The foot part 26 is accommodated in a recess 46 at the bottom side of the base element 30. The recess 46 in FIG. 2 comprises a fixing element 48 for fixing the foot part 26. In FIG. 2, this fixing element 48 is a projection, which is configured to absorb the moment exerted on the support element 10 by a two-wheeler placed against the support element 10.

The two-wheeler stand 1 shown in FIG. 2 can be assembled in a simple manner in that the carrying element 20 can be moved through a passage 42. The passage 42 in the base element 30 extends from the bottom side (in use) to the upper side of the base element 30. A user slides the carrying element 20 through the passage 42 from the bottom side until the foot part 26 is positioned in the recess 46. The user can snap the foot part 26 in place behind (in this case above) the fixing element 48.

FIG. 2 further shows that at least the upper wall 32, the lower wall 34 and/or the circumferential wall 36 of the base element 30 can be made of a relatively thin-walled material. This makes it possible to maximise the volume of the chamber 33 and to minimise the weight of the unfilled base element. FIG. 2 further shows that the filling hole 31, through which the chamber 33 can be filled, can be closed by means of a cap element 44.

FIG. 3 shows in perspective view a partially disassembled second embodiment of the two-wheeler stand 100. In order to prevent unnecessary repetition, corresponding parts are indicated by the same numerals as used in FIGS. 1 and 2 augmented by 100 in FIG. 3 (and FIG. 4). The cap element 144 in FIG. 3 for example corresponds to the cap element 44 in FIG. 1. The embodiment shown in FIG. 3 is essentially the same as the one shown in FIG. 1, but is different therefrom in three aspects. In the first place, the further connecting means 116, 124 in FIG. 3 are in the form of a bar member 116 on the support element 110, which is configured to be received in the carrying element 120. By sliding the bar member 116 into or out of the carrying element 120, it is possible to adjust the height of the support element 110 relative to the wheel supporting surface 138. After said adjustment, the desired position and thus the height of the support element 110 can be fixed using a fixing means 124 such as a screw or a clamp.

In the second place, the bracket 114 of the support element 110 in FIG. 3 is essentially directed upward for receiving a front wheel of a two-wheeler.

Finally, the base element 130 is provided with a laterally extending (in use) projection 150 on one side of the circumferential wall 136, and with a recess 151 formed to correspond to the projection 150 on a second side of the circumferential wall 136 opposite the first side. In this way a male-female connection 150, 151 is formed, by means of which several base elements 130 can be positioned in contact with each other. In FIG. 4 this male-female connection 150, 151 is shown in cross-sectional view.

Figure 5:
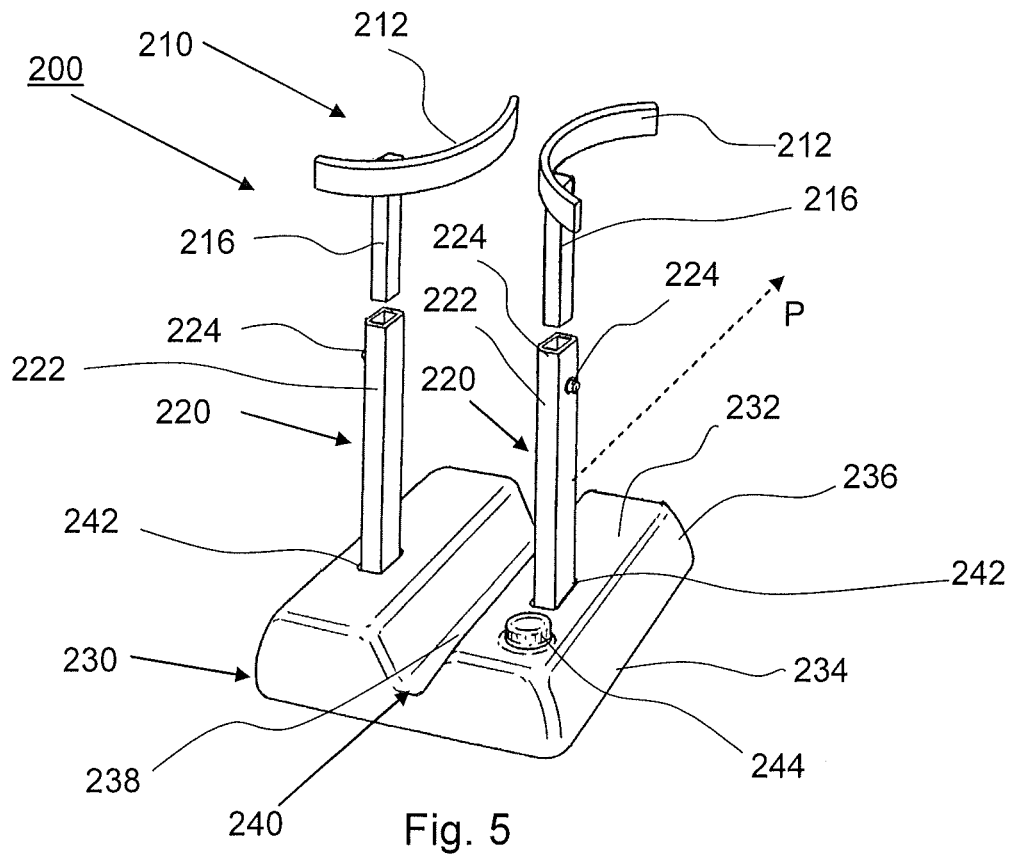
FIG. 5 is a perspective view of a partially disassembled third embodiment of the two-wheeler stand.

FIG. 5 shows in side view a partially disassembled third embodiment of the two-wheeler stand 200. In order to prevent unnecessary repetition, corresponding parts are indicated by the same numerals as used in FIGS. 1 and 2 augmented by 200 in FIG. 5 (and FIG. 6). The cap element 244 in FIG. 5 for example corresponds to the cap element 44 in FIG. 1. The embodiment shown in FIG. 5 is essentially the same as the one shown in FIG. 1, but is different therefrom in a number of aspects. In the first place, FIG. 5 shows two substantially parallel carrying elements 220 located on either side of the positioning element 240. The two carrying elements 220 are provided with the vertically adjustable further connecting means 224, similar to the carrying element 20 shown in FIG. 3.

In the second place, the base element 230 comprises two connecting means 224, such as receiving cavities or passages 242 for positioning the carrying element 220 in the base element 230.

In the third place, in FIG. 5 each support element 210 comprises one support element portion 212 attached to one carrying element 220. FIG. 5 furthermore clearly shows that the two support element portions 212 are provided in such a manner that they support a front fork and/or front wheel of a parked two-wheeler in use, wherein each one of the support element portions 212 extends at an angle to the longitudinal direction P between a front side of the two-wheeler stand and a rear side of the two-wheeler stand. The support element portions 212 are disposed at an angle relative to each other such that a substantially converging (between the front side and rear side) receiving opening for the front fork and/or front wheel of the two-wheeler is formed between the support element portions 212. Because of the converging configuration of the receiving opening, front forks or wheels of varying dimensions can be accommodated in a simple manner.

Figure 6:
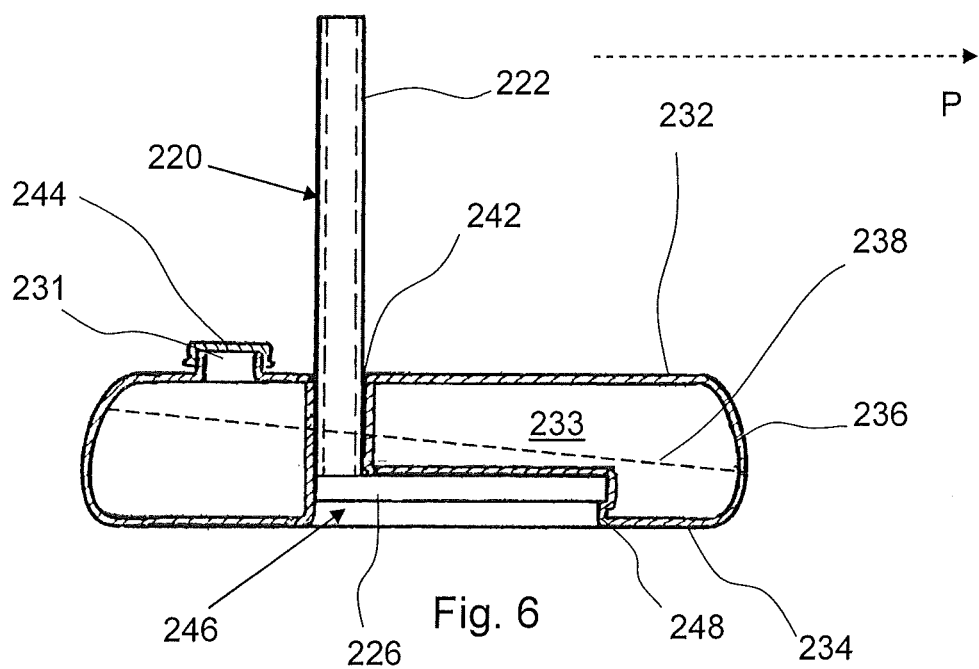
FIG. 6 is a longitudinal sectional view of a base element and a carrying element according to the third embodiment of the two-wheeler stand.

FIG. 6 shows a longitudinal sectional view of a base element 230 and a carrying element 220 according to the third embodiment of the two-wheeler stand 1. As FIG. 6 shows, the foot part 226 extends in the longitudinal direction P in the recess 246. A fixing element 248 holds the foot part 226 in place. FIG. 6 furthermore shows that the wheel supporting surface 238 for load-carrying support of the front wheel essentially slopes down between the front side and the rear side of the two-wheeler stand 200. A wheel placed on said wheel supporting surface 238 is thus driven against the support element 210 under the influence of the force of gravity.

Figure 7:
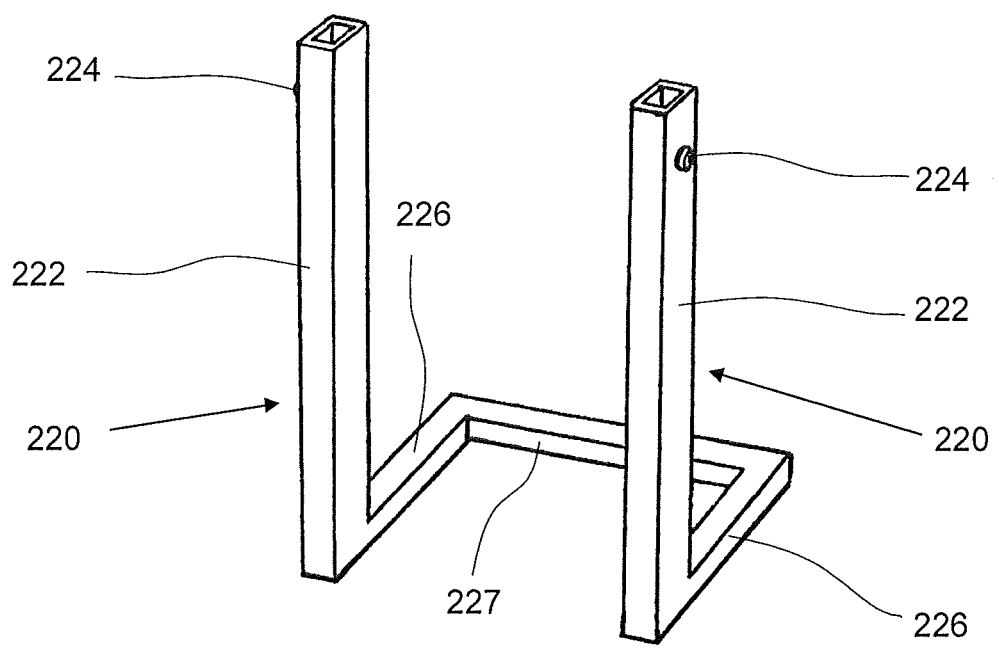
FIG. 7 is a perspective view of a carrying element of the third embodiment of the two-wheeler stand.

FIG. 7 shows in perspective view a third embodiment of the carrying element 220 for a two-wheeler stand 200. Two carrying elements 220 are shown in FIG. 7, which are each configured similarly to the embodiment shown in FIGS. 3 and 4. In FIG. 7, the two carrying elements 220 are connected at their foot parts 226 via a connecting means 227, a connecting bar 227 in FIG. 7, so that the foot parts 226 and the connecting means 227 define a U-shape for realising a stable position of the carrying element is 220 and thus the two-wheeler.

Figure 8:
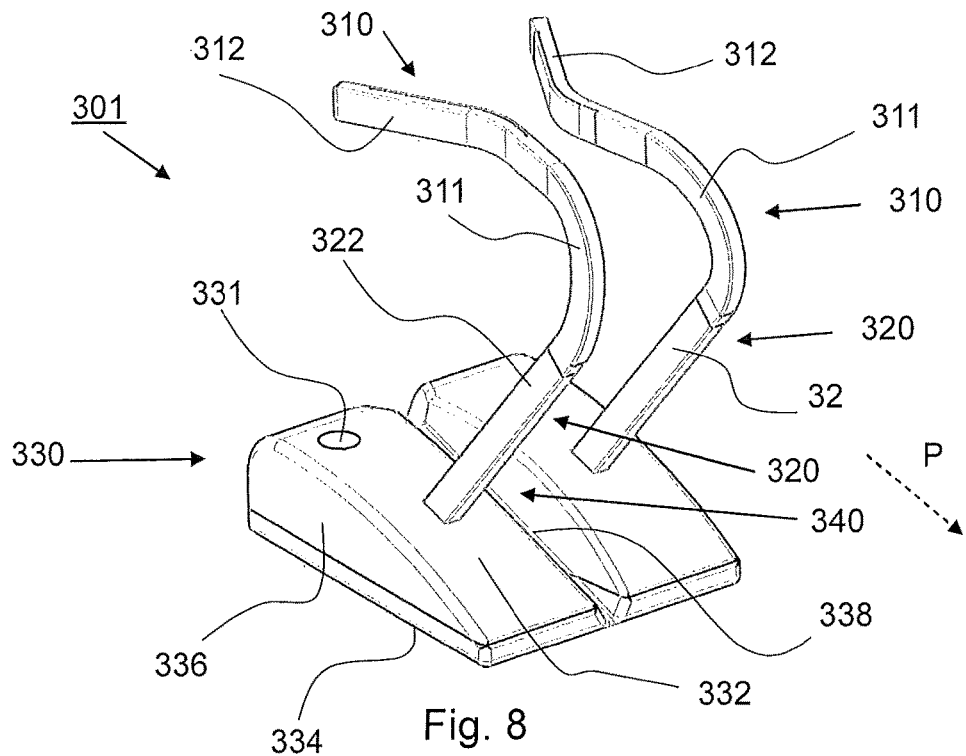
FIG. 8 is a perspective view of a fourth embodiment of the two-wheeler stand according to the present invention.
Figure 9:
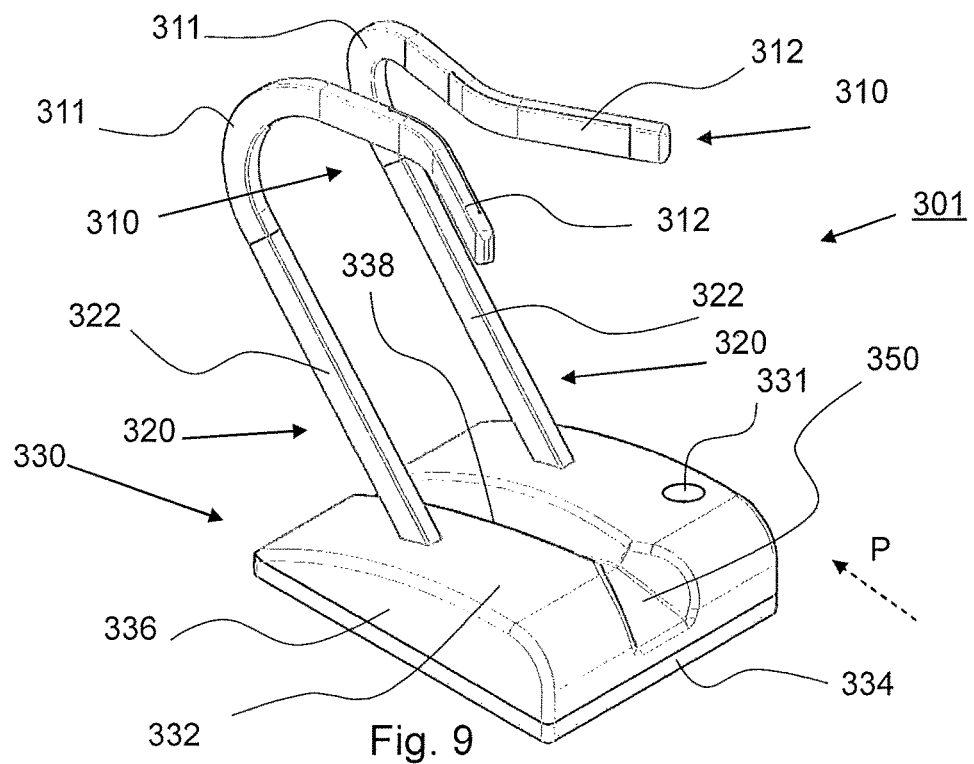
FIG. 9 is a perspective view of a side opposite the side shown in FIG. 8 of the fourth embodiment of the two-wheeler stand according to the present invention.
Figure 10:
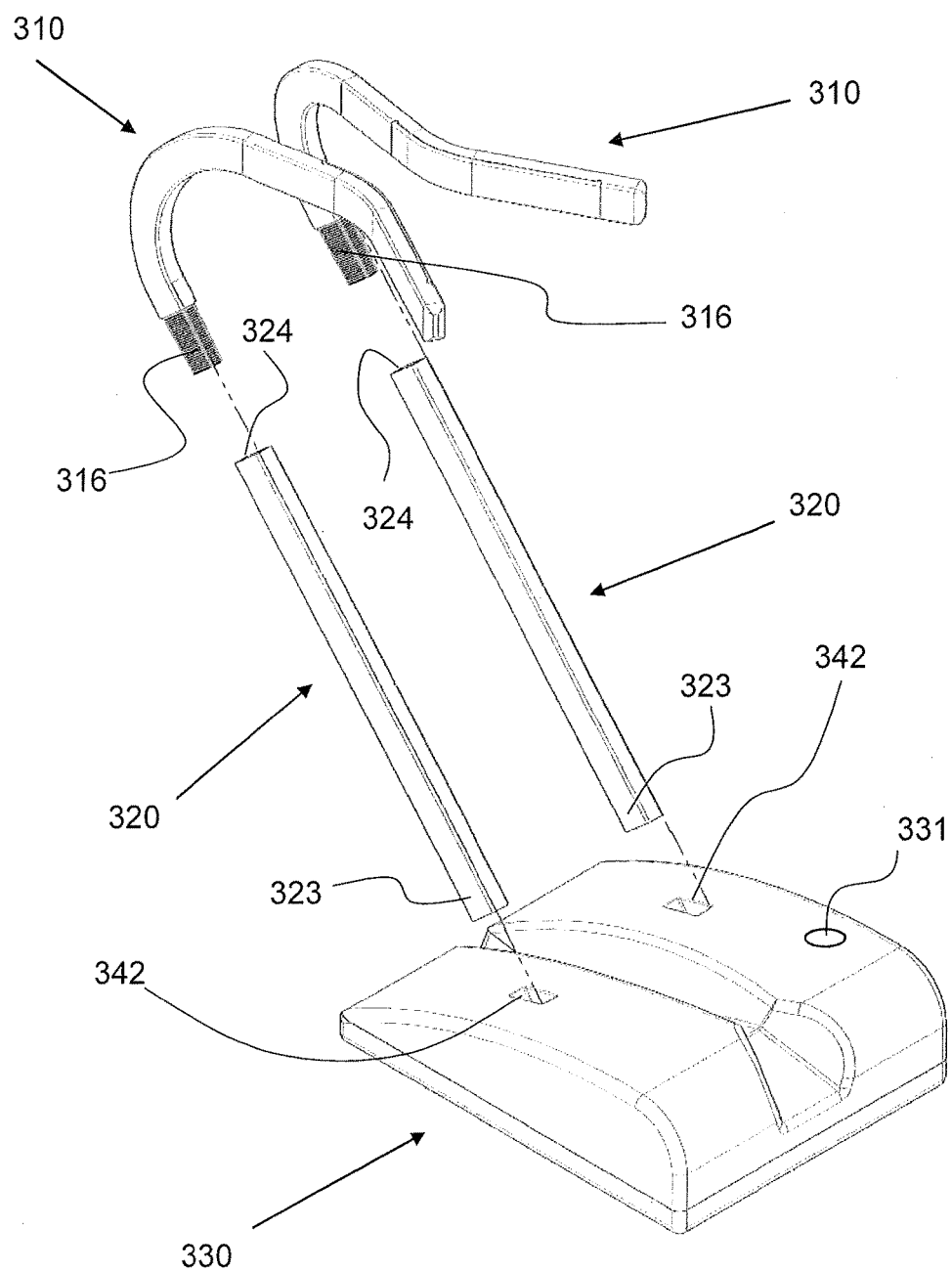
FIG. 10 is an exploded view of the two-wheeler stand according to the fourth embodiment.

FIGS. 8, 9 and 10 show a fourth embodiment of a two-wheeler stand 301 according to the present invention. In order to prevent unnecessary repetition, corresponding parts are indicated by the same numerals as used in FIGS. 1 and 2 augmented by 300 in FIG. 8 (and FIGS. 9 and 10). The embodiment shown in FIG. 8 is essentially the same as the one shown in FIG. 5 but is different therefrom in a number of aspects, as will become apparent from the description below.

The two-wheeler stand 301 is made up of a hollow base element 330, to which to carrying elements 320 are detachably attached. Each carrying element 320 is provided with a support element 310. The base 330 consists of an upper wall 332, a lower wall 334 and a circumferential wall 336. A recess 340 is provided in the upper wall 332 of the base 330, which recess forms the positioning element 340 with the associated wheel supporting surface 338. The base is in particular made of plastic or another lightweight material. The carrying element 320 is made up of an elongate section 322. Said section 332 may in particular be made of a metal, for example aluminum. The support element 310 is made up of a curved, elongate section, consisting of a bend portion 311 and a support element portion 312. In the illustrated embodiment, the support element portions 312 are configured to support a front fork of a parked bicycle in use, for which purpose they taper to a V-shape, seen in the direction of the arrow P.

As is clearly shown in FIG. 9, an entry guide 350 is provided at the front side of the two-wheeler stand for guiding a front wheel of a two-wheeler to the positioning element 340. This entry guide 350 is provided in the form of a recess in the base 330 and slopes upward from the front side to the highest point of the positioning element 340, which subsequently slopes down, in particular continuously, in the direction indicated by the arrow P, such that a front wheel of the bicycle is pushed in the direction of the arrow P, thereby firmly pushing the bicycle in place in the support element portions 312.

FIG. 10 shows the structure of the fourth embodiment of the two-wheeler stand 301 according to the present invention. The figure clearly shows that the two-wheeler stand 301 essentially consists of five parts: a base element 330, two carrying elements 320, and two support elements 310. Fixing holes 342 are provided in the base element 310, which fixing holes are not configured as walls but as entry guides 342 in the illustrated embodiment. The lower end 323 of the carrying element 310 can be placed in the entry guide 342 with a tight or a close fit. In the same manner or a similar manner, the support element 310 is provided with connecting means 316 in the form of a section of rectangular cross section, which can be placed in the hollow end 324 of the carrying element 310 with a tight or a close fit.

Prior to or after the various parts 320, 310 have been mounted, the base element 330 can be filled with a medium through the filling hole 331.

Figure 11:
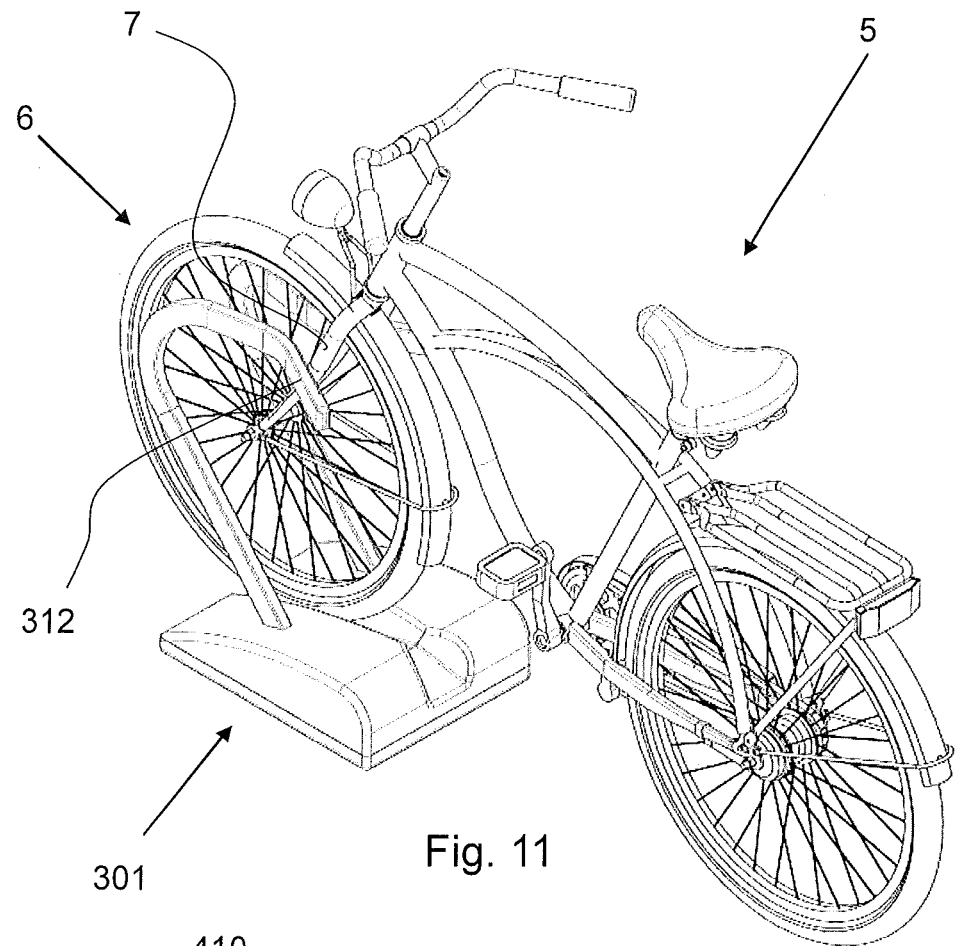
FIG. 11 is a perspective view of a two-wheeler stand according to the present invention with a bicycle parked therein.

FIG. 11 shows a two-wheeler stand 301 according to the present invention with the two-wheeler 5 placed therein. The two-wheeler 5 is placed in the two-wheeler stand 301 with its front wheel 6. The front wheel 6 is placed on the wheel supporting surface of the positioning element (not shown here). A front fork 7 of the bicycle is supported on the two support element portions 312.

Figure 12:
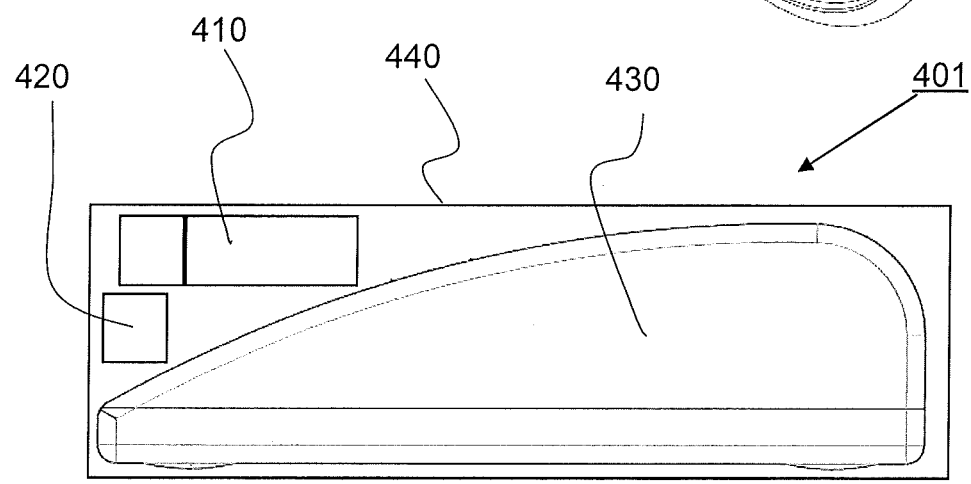
FIG. 12 is a sectional view of a packaging unit containing a set of parts for forming a two-wheeler stand according to the present invention.

FIG. 12, to conclude, shows in sectional view a packaging unit 401 containing a set of parts for forming a two-wheeler stand according to the present invention. The set of parts comprises a base element 430, a carrying element 420 and a support element 410. In a special embodiment, the set comprises a base element 420, two carrying elements 420 and two support elements 430. This set of parts is packaged in a packaging unit 401, in particular a box, such as a cardboard box. Because the base element 430 is a fillable base element, the box 401 with parts is very light and thus easy to transport at low cost.

Only a few embodiments of the present invention are shown in the figures and discussed in the above description. The skilled person will appreciate that many variants, which may or may not be obvious, are possible within the scope of the present invention as defined in the appended claims.

The invention claimed is:

1. A two-wheeler stand configured to support a two-wheeler parked in or on the two-wheeler stand, comprising:
   a base element comprising an upper wall, a lower wall, and a circumferential wall connecting the upper wall and the lower wall, wherein the upper wall, the lower wall and the circumferential wall enclose a chamber, wherein a filling hole is provided in the base element such that the chamber can be filled with a medium through the filling hole, wherein a positioning is provided in the base element at an upper side of the base element, wherein the positioning recess defines a wheel supporting surface, which, in use, is adapted to support a wheel of a two-wheeler parked in the two-wheeler stand;
   at least one carrying element extending upwardly from the base element, the at least one carrying element detachably connected to the base element, the at least one carrying element comprising an elongate bar and a foot connected to the elongate bar at an angle thereto, the base element comprising a passage therethrough through which the elongate bar extends with the foot arranged along a foot recess in a bottom side of the base element; and
   at least one support element carried by the at least one carrying element, the at least one support element adapted to support a front fork and/or a wheel of a two-wheeler parked in the two-wheeler stand.

2. The two-wheeler stand according to claim 1, wherein the two-wheeler stand comprises two carrying elements located on either side of the wheel supporting surface, wherein the two carrying elements extend parallel to each other in use.

3. The two-wheeler stand according to claim 1, comprising two support elements, which, in use, support a front fork and/or a front wheel of a parked two-wheeler, wherein each of the two support elements extend between a front side of the two-wheeler stand and a rear side of the two-wheeler stand, wherein the support elements are disposed at an angle relative to each other, such that a receiving opening between the support elements converges between the front side and the rear side.

4. The two-wheeler stand according to claim 3, wherein the wheel supporting surface slopes down between the front side and the rear side of the two-wheeler stand.

5. The two-wheeler stand according to claim 1, wherein the at least one support element is detachably connectable to the at least one carrying element.

6. The two-wheeler stand according to claim 1, wherein an entry guide is provided in the base element adapted to guide a front wheel of a two-wheeler to the positioning recess.

7. The two-wheeler stand according to claim 6, wherein the entry guide slopes upward from the front side in a direction of the positioning recess.

* * * * *

UNITED STATES PATENT AND TRADEMARK OFFICE
CERTIFICATE OF CORRECTION

PATENT NO. : 9,676,433 B2  
APPLICATION NO. : 14/946127  
DATED : June 13, 2017  
INVENTOR(S) : Maurice Wilhelmus León Paulssen et al.

Page 1 of 1

It is certified that error appears in the above-identified patent and that said Letters Patent is hereby corrected as shown below:

In the Claims

In Column 10, Line 10, add the word "recess" after the word "positioning".

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*